Figure 1:
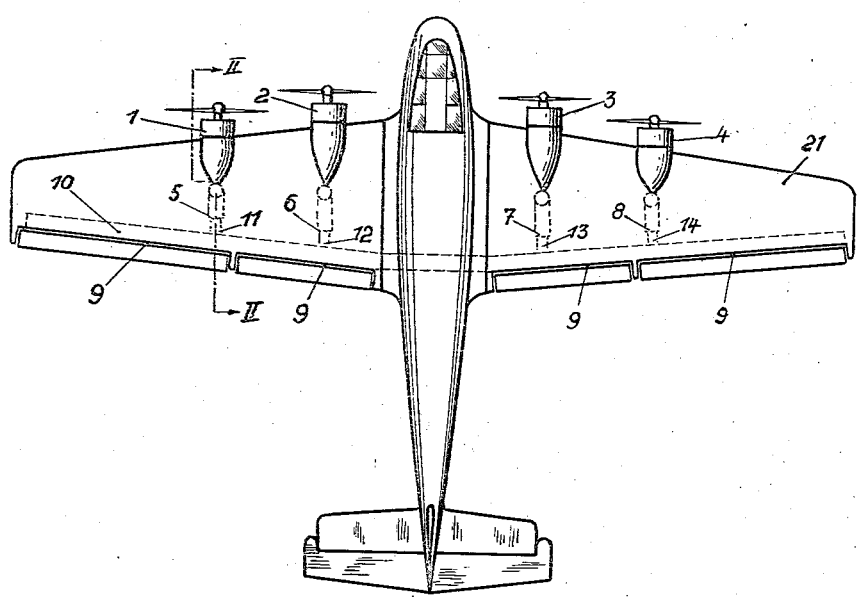

March 24, 1942.  H. WAGNER ET AL  2,277,173
AIRPLANE MECHANISM
Filed July 7, 1939   3 Sheets-Sheet 2

Inventors
Herbert Wagner
Hans Gropler
Georg Bockhaus
by
Gerard P. Baldwin

March 24, 1942.  H. WAGNER ET AL  2,277,173
AIRPLANE MECHANISM
Filed July 7, 1939  3 Sheets-Sheet 3

Inventors
Herbert Wagner
Hans Gropler
Georg Backhaus
By Gerald S. Baldwin
Their Attorney.

Patented Mar. 24, 1942

2,277,173

UNITED STATES PATENT OFFICE 2,277,173

AIRPLANE MECHANISM

Herbert Wagner, Hans Gropler and Georg Backhaus, Dessau, Germany, assignors to Junkers Flugzeug - und - Motorenwerke Aktiengesellschaft, Dessau, Germany, a corporation of Germany Application July 7, 1939, Serial No. 283,252
In Germany July 11, 1938

24 Claims. (Cl. 244—40)

This invention relates to improvements in airplane mechanisms, and refers more particularly to a mechanism by which suction is exerted upon the skin layer of air adjacent one portion of an airplane and this air is discharged into the skin layer adjacent another portion of the plane. Moreover the mechanism is usually intended for multi-motored planes to withdraw the skin layer of air from the upper surfaces of the wings and discharge it rearwardly into the skin layer beneath their lower surfaces.

It is an object of the invention to provide such an airplane mechanism wherein a plurality of pumping devices are connected to a common passage through which air flows from suction inlets to discharge outlets, so that upon failure of one or more of the pumping devices a substantially uniform suction is still maintained upon the entire skin layer upon which the mechanism is intended to operate. For instance, if air is being exhausted from zones of the skin layer on the upper wing surfaces across the entire wing spread, such a condition will still prevail even after failure of one or more of the pumping devices, thereby eliminating the possibility of the occurrence of undesired torques about the longitudinal axis of the airplane.

Another object of the invention is to provide such a mechanism with shut-off valves, preferably automatically operated, for preventing any undesired air flow through the passage from the discharge outlets, or from the passage through the suction inlets in the event of failure of one or more of the pumping devices; moreover the mechanism should be so formed that eddies do not occur therein and, for purposes of simplicity of construction, we prefer that the shut-off valves be located where discharge from the mechanism occurs.

A further object of the invention is to provide such a mechanism into which air is drawn from the upper skin layer and discharged rearwardly and downwardly through outlets formed through the lower side of the wing structure into the lower skin layer to obtain both reduced air resistance and increased propelling force. To obtain this result the shut-off valves may be constructed in the form of guide vanes.

Means have already been introduced for controlling suitable suction lines having inlets which are spaced longitudinally of an airplane in parts thereof of different cross sectional forms which are provided to produce transverse lifting forces, the purpose being to cause a circulation flow and create a lifting force by means of exhausting air from suitable locations around the periphery of parts which, without such an arrangement, would be unsuited for the creation of such transverse lifting forces. This invention, on the contrary, aims to provide means for exhausting and discharging air efficiently particularly across the wing spread of airplanes the airfoils and flaps of which are of various forms, and refers to the provision of control means transversely of the longitudinal axis of the plane for varying the volume of air exhausted across the wings symmetrically on both sides of the said longitudinal axis. Moreover the control means are so arranged in each zone of the wing structure that a greater volume of air is exhausted and discharged where flaps occur. It is also particularly advantageous to so arrange the control means that less air is exhausted from adjacent the fuselage than from zones of the wing structure more remote therefrom. The air-flow is more disturbed near the fuselage when the angle of incidence is increased and thereafter no downward flow of air occurs. Thus the tail surfaces are acted upon less by downwardly directed air and more by normal air flow so that the nose of the airplane becomes heavy and brings the plane back into its normal flight position. The control means, which may be of different forms, should be located adjacent the exhaust inlets to avoid constrictions within the passage through which the air passes.

Figure 2:
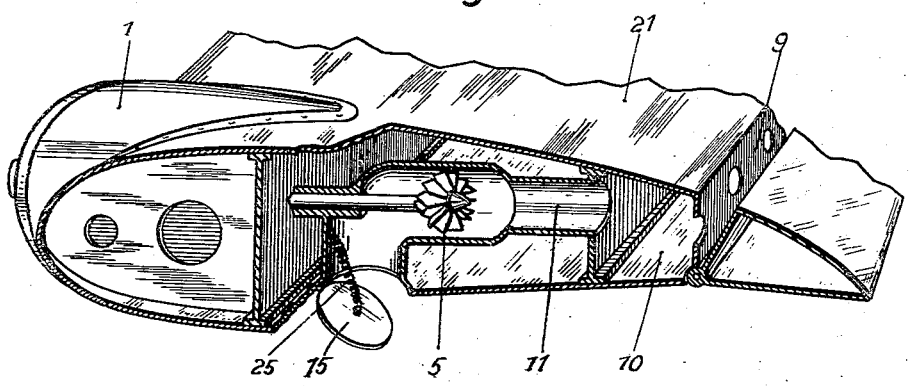
Figure 3:
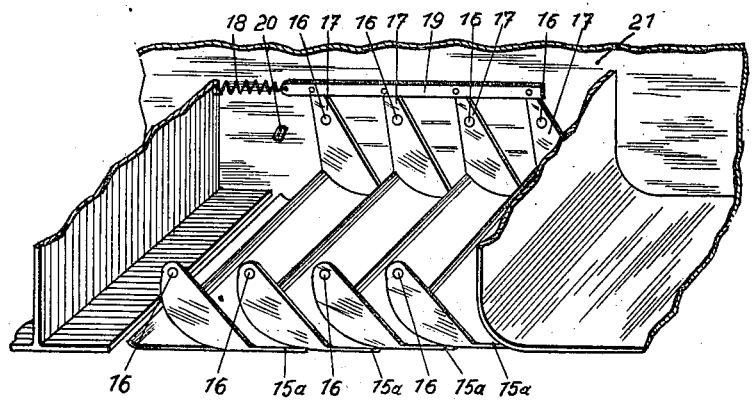
Figure 4:
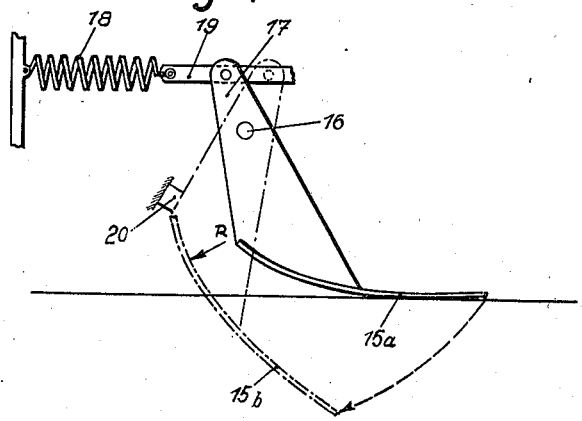
Figure 5:
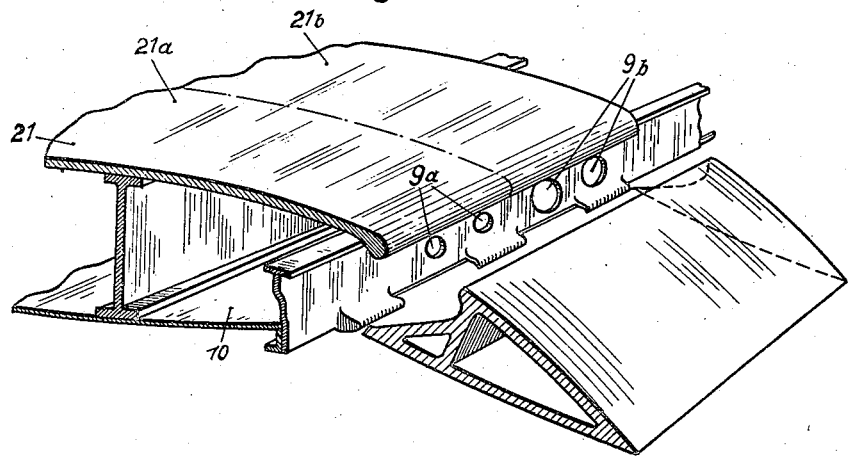
Figure 6:
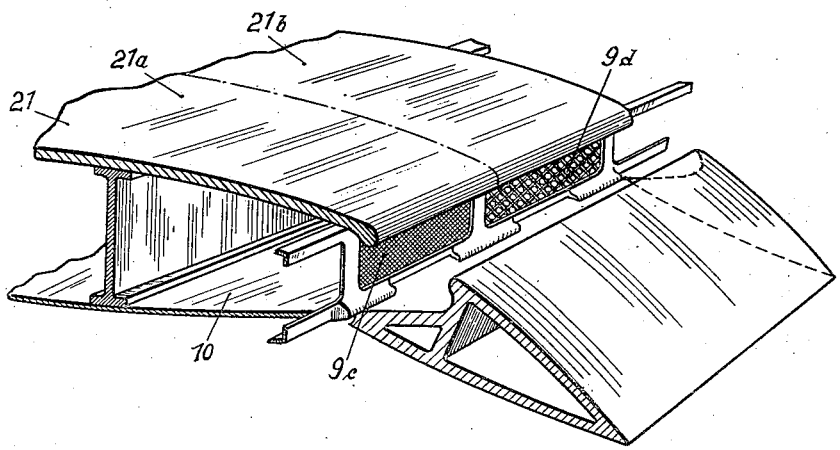

The construction of our invention is more fully described with the aid of the accompanying drawings, in which:

Figure 1 illustrates a plan view of a multi-motored airplane, wherein each motor operates a separate pumping device, Figure 2 is an enlarged sectional view on the line II—II of Figure 1, Figure 3 is an enlarged perspective view, partly in section, showing a modified shut-off valve arrangement, Figure 4 shows diagrammatically the operation of this valve, Figure 5 is a perspective view, partly in section, of a portion of a wing structure showing control means for varying the volume of the air exhausted in different zones, and Figure 6 is a similar perspective view showing a modified arrangement of the control means.

Referring now to Figures 1 and 2 of the drawings, motors 1, 2, 3 and 4 each operate one of the pumping devices 5, 6, 7 and 8 respectively. In this instance it is assumed that suction is exerted upon the air skin layer on the upper sides of the wings and discharge occurs into the skin layer adjacent the lower sides of the wings. Apertures 9, the cross sectional area of which constitutes the control means for regulating the amount of air exhausted, are formed through the wings 21 from their upper sides into a common passage 10 which extends substantially the entire width of the wing spread. From the passage 10 branches 11, 12, 13 and 14 extend in each of which one of the pumping devices 5, 6, 7, and 8 respectively is provided so that all the latter exhaust air from the said common passage 10. In each of the branches 11, 12, 13 and 14, adjacent its discharge end a shut-off valve 15 is arranged which, in the event of failure of the pumping device in that branch, is automatically closed, in the present instance by a spring 25. While in the event of failure of one or more of the pumping devices the volume of air exhausted from the low pressure side of the wing is reduced, this reduction remains substantially proportionate over the portions of the wing spread adjacent all the apertures 9, and thus no undesired torques result about the longitudinal axis of the airplane. Moreover it will also be noted that the valves 15 operate as guides, or deflecting vanes, in that they deflect the discharged air rearwardly into the skin layer along the lower wing surface.

In the modification shown in Figures 3 and 4 a somewhat varied form of shut-off valve arrangement is shown. In the branch a plurality of shut-off valves 15a, each formed like a guide vane, are each provided with a flexed extension 17 which is pivoted at 16 upon the wing structure 21. The extensions 17 are also pivoted to a rod 19 one extremity of which is connected by a spring 18 to one wall of the branch. Normally this spring retains the valves 15a in the closed positions shown in Figure 3, but when air is being discharged from the branch the air pressure causes pivotal movement of the valves in the direction of the arrow R to positions indicated at 15b (Figure 4), where one valve strikes a stop 20 by which its further pivotal movement is prevented. In the event of failure of the pumping device (not shown) operating in that branch, the valves are immediately returned to their closed positions by the spring 18 and air flow from the underside of the wing into that branch is prevented. It will again be noted that the shape of the valves 15a is such that the air is discharged rearwardly along the skin layer adjacent the underside of the wing 21 and is substantially eddy-free. Thus air resistance is reduced and a propelling force is added correspondingly to the speed of discharge of the air from the branch.

Referring now to Figure 5, we will assume that the wing zone 21a is nearer to the fuselage than the wing zone 21b, so that it is desired to exhaust less air inwardly through the control means formed by the cross sectional area of the apertures 9a in the wing zone 21a than through the apertures 9b in the wing zone 21b. Therefore the apertures 9a are made smaller than the apertures 9b, and in this manner a lesser volume of air is exhausted in the zone 21a than in the zone 21b since the suction exerted in all the apertures which open into the common passage 10 must be uniform throughout the length of the latter.

Similarly in Figure 6, and for the same reason, one wall of the passage 10 consists in part of sections of wire netting 9c and 9d, and since the wing zone 21a is nearer to the fuselage than the wing zone 21b the wire netting 9c is of finer mesh than the netting 9d so that less air is exhausted through the former than the latter.

In this manner the cross sectional area of the apertures through which air is exhausted is utilized as the control means, thereby eliminating the necessity for additional equipment to serve this purpose.

While in the foregoing preferred embodiments of the invention have been described and shown, it is understood that the invention is susceptible to such further alterations and modifications as fall within the scope of the appended claims.

What we claim is:

1. An airplane mechanism of the character described comprising a passage provided through a portion of an airplane, said passage having laterally disposed apertures therethrough opening to the outer air, a plurality of branches extending from the passage each opening into the outer air, a separate pumping means for forcing air through each branch, and valve means in each branch operable to prevent a reversal of air flow upon failure of the pumping means for that branch, and means for operating each valve means.

2. An airplane mechanism of the character described comprising the combination set forth in claim 1, wherein the means for operating each valve means is automatic and is adapted to close its valve means upon failure of the pumping means cooperating with the branch in which that valve means operates.

3. An airplane mechanism of the character described comprising the combination set forth in claim 1, wherein the valve means in each branch consists of a plurality of separate valves.

4. An airplane mechanism of the character described comprising the combination set forth in claim 1, wherein a separate driving means is provided for each pumping means.

5. An airplane mechanism of the character described comprising the combination set forth in claim 1, wherein the means for operating each valve means consists of a spring.

6. An airplane mechanism of the character described comprising a passage extending transversely of a wing structure, said passage having spaced apertures therethrough opening into the outer air, a plurality of branches extending from said passage each opening at its extremity into the open air, a separate pumping means in each branch adapted to exhaust air from the skin layer into which the passage apertures open and to discharge said air through the extremity of its branch into the skin layer adjacent thereto, and valve means in each branch operable to prevent a reversal of airflow therethrough upon failure of the pumping means therein.

7. An airplane mechanism of the character described comprising the combination set forth in claim 6, wherein the valve means are so formed that they are adapted to deflect the discharged air rearwardly and downwardly into the skin layer.

8. An airplane mechanism of the character described comprising the combination set forth in claim 6, wherein the valve means in each branch consists of a plurality of valves having flexed portions pivoted on the wing structure, said valves being shaped to deflect rearwardly air passing out of the branch, and spring means adapted to close all the valves.

9. An airplane mechanism of the character described comprising a passage extending transversely across the wings of an airplane having spaced openings therethrough in communication with the air skin layer adjacent the upper sides of the wings, means controlling the volume of air flowing into the passage symmetrically on both sides of the longitudinal axis of the airplane to admit a lesser volume near the fuselage and a larger volume at points more remote therefrom, branches extending from the passage opening into the skin layer adjacent the undersides of the wings, pumping means for exhausting air through the passage openings and discharging it through the branch openings, and means preventing a reversal of airflow.

10. An airplane mechanism of the character described comprising the combination set forth in claim 9, wherein separate pumping means are provided for exhausting air through each branch and all the pumping means are adapted to draw air into the passage through all the openings in the latter.

11. An airplane mechanism of the character described comprising the combination set forth in claim 9, wherein the means for controlling the volume of air flowing into the passage consists in the provision of differently sized openings in the latter.

12. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, a valve in each exhaust passage, and means for actuating each valve.

13. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, a valve in the opening of each exhaust passage, each valve being so constructed and arranged as to direct, when open, exhaust air passing therethrough rearwardly along the surface of the wing, and means for actuating each valve.

14. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, and a valve in each exhaust passage, said valve being so constructed and arranged as to close automatically in the absence of exhaust air pressure in the passage.

15. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, and a pressure-sensitive one-way valve closing the opening of each exhaust passage.

16. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, a valve plate pivoted at the opening of each exhaust passage, and yieldable means retaining each plate in closed position in the absence of exhaust pressure within the passage.

17. In an airplane the combination of a wing, a main air passage within the wing, said passage including openings communicating with the exterior surface of said wing, a plurality of motors, a pump driven by each motor, an intake passage between each pump and said main passage, an exhaust passage from each pump communicating with the exterior of said wing, a valve plate pivoted at the opening of each exhaust passage, and yieldable means retaining each plate in closed position in the absence of exhaust pressure within the passage, said plate being so pivoted as to direct, when open, exhaust air passing therethrough rearwardly along the surface of the wing.

18. In an airplane the combination of a fuselage and a wing, a main air passage extending longitudinally within the wing, said passage including separate openings of different areas communicating with the exterior surface of the wing, said openings being of progressively greater area from the fuselage outwardly, a plurality of motors, a pump driven by each motor, an intake passage between each pump and said main air passage, and an exhaust passage from each pump communicating with the exterior of said wing.

19. In an airplane the combination of a fuselage and a wing, a main air passage extending longitudinally within the wing, said passage including separate openings of different areas communicating with the exterior surface of the wing, said openings being of progressively greater area from the fuselage outwardly, a plurality of motors, a pump driven by each motor, an intake passage between each pump and said main air passage, an exhaust passage from each pump communicating with the exterior of said wing, a valve in each exhaust passage, and means for actuating each valve.

20. In an airplane the combination of a fuselage and a wing, a main air passage extending longitudinally within the wing, said passage including separate openings of different areas communicating with the exterior surface of the wing, said openings being of progressively greater area from the fuselage outwardly, a plurality of motors, a pump driven by each motor, an intake passage between each pump and said main air passage, an exhaust passage from each pump communicating with the exterior of said wing, and a pressure-sensitive one-way valve closing the opening of each exhaust passage.

21. In an airplane the combination of a fuselage and a pair of wings, a main air passage extending longitudinally across the interior of both wings, said passage including openings communicating with the exterior surface of said wing, a plurality of motors, a pump driven by each motor, an intake passage between each pump and said main passage, and an exhaust passage from each pump communicating with the exterior of said wing.

22. In an airplane the combination of a fuselage and a pair of wings, a main air passage extending longitudinally across the interior of both wings, said passage including separate openings of different areas communicating with the exterior surface of the wing, the openings in each wing being of progressively greater area from the fuselage outwardly, a plurality of motors, a pump driven by each motor, an intake passage between each pump and said main passage, and an exhaust passage from each pump communicating with the exterior of said wing.

23. In an airplane the combination of a fuselage and a pair of wings, a main air passage extending longitudinally across the interior of both wings, said passage including separate openings of different areas communicating with the exterior surface of the wing, the openings in each wing being of progressively greater area from the fuselage outwardly, a plurality of motors, a pump driven by each motor, an intake passage between each pump and said main passage, an exhaust passage from each pump communicating with the exterior of said wing, a valve in each exhaust passage, and means for actuating each valve.

24. In an airplane the combination of a wing, a main air passage within the wing, said passage including openings communicating with the upper exterior surface of said wing, a plurality of motors, a pump driven by each motor, an intake between each pump and said main passage, an exhaust passage from each pump communicating with the exterior of said wing adjacent the under surface thereof, a valve in each exhaust passage, and means for actuating each valve.

HANS GROPLER.
GEORG BACKHAUS.
HERBERT WAGNER.